Feb. 18, 1969  S. T. MARTIN  3,428,375
BEARING HAVING FLEXIBLE SEAL ARRANGEMENT
Filed Nov. 9, 1965
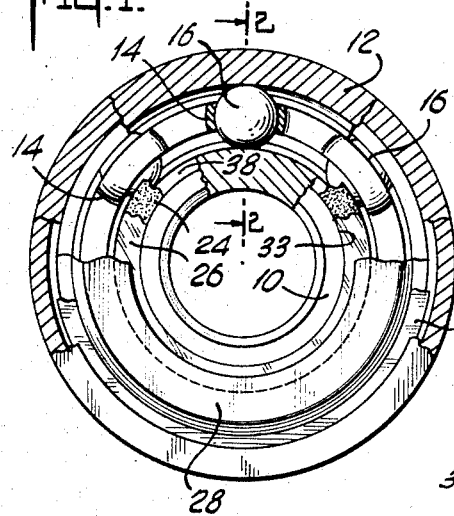
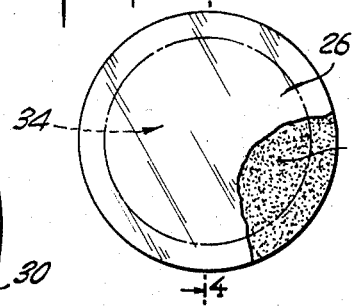
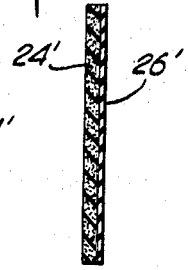
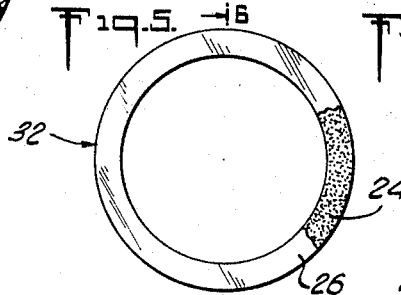
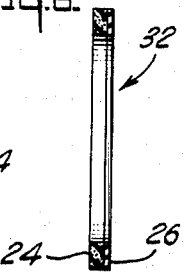
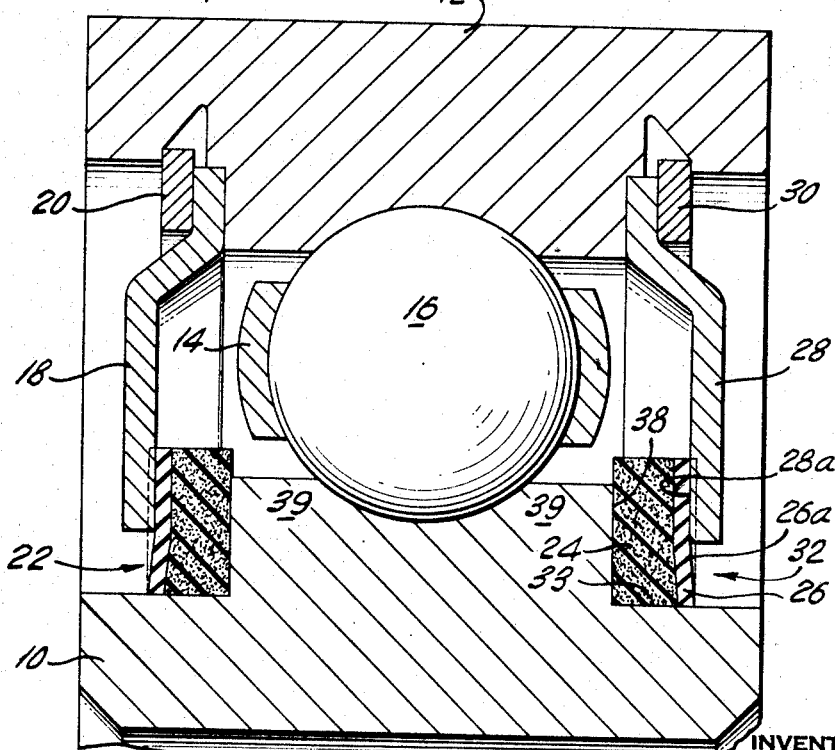
INVENTOR
STEVEN T. MARTIN
BY
Hopgood & Calimafde
ATTORNEYS

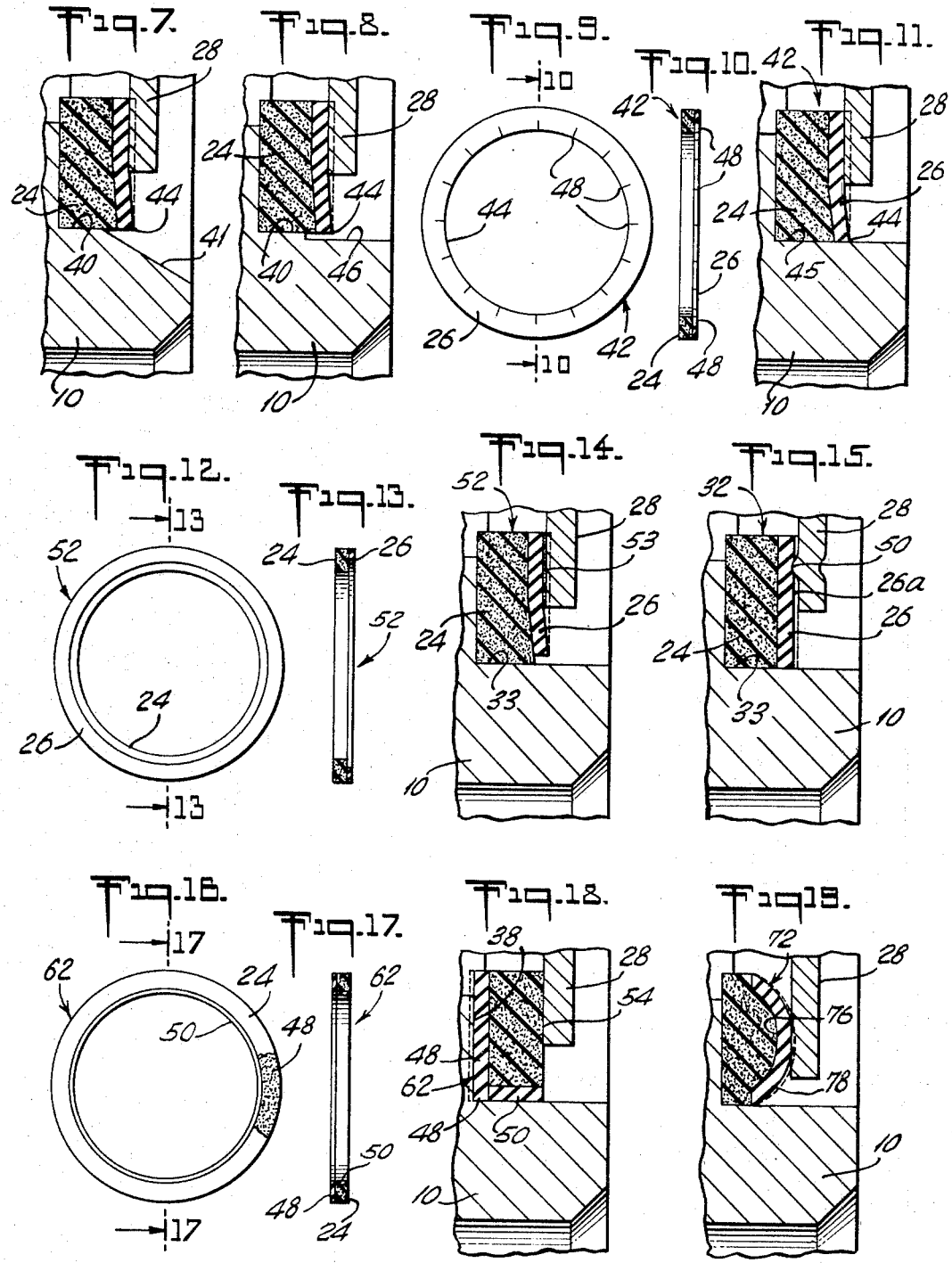

United States Patent Office 3,428,375
Patented Feb. 18, 1969

3,428,375
BEARING HAVING FLEXIBLE SEAL
ARRANGEMENT
Steven T. Martin, West Hartford, Conn., assignor, by
mesne assignments, to Textron, Inc., Providence, R.I.,
a corporation of Delaware
Filed Nov. 9, 1965, Ser. No. 507,003
U.S. Cl. 308—187.2                           1 Claim
Int. Cl. F16c 33/78; F16j 15/00

ABSTRACT OF THE DISCLOSURE

A very low frictional drag bearing seal structure which provides more effective sealing under conditions of misalignment and includes a Teflon-sponge rubber assembly between two members adapted for rotation relative to each other.

---

This invention relates to bearings having an improved type of bearing seal and is particularly useful for low torque applications.

In the prior art, various arrangements have been devised to provide a bearing seal arrangement which is more effective in preventing contaminants from entering the bearing while maintaining lubricant therein. Difficulty has been encountered, however, when such arrangements are employed for low torque applications, since the prior seal arrangements that have been most effective have generally introduced substantial frictional resistance to the rotation of the bearing.

Accordingly, it is an object of this invention to provide a novel bearing construction for a low torque bearing.

Another object of the invention is to provide a bearing which provides a more effective seal, said construction introducing substantially less frictional resistance than was heretofore introduced for a seal of the same effectiveness.

A further object of the invention is to make available an improved bearing seal construction which provides a more effective seal for a bearing having a given amount of misalignment between the inner and outer rings thereof.

Yet another object is to provide a bearing construction which will maintain positive seal contact regardless of direction of thrust.

All of the objects, features and advantages of this invention and the manner of attaining them will become more apparent and the invention itself will be best understood by reference to the following description of an embodiment of the invention taken in conjunction with the accompanying drawing, in which:

FIG. 1 shows a side view of a bearing, partly in section, which employs a bearing seal arrangement in accordance with the invention, FIG. 2 is a cross-sectional view of the upper portion of the bearing of FIG. 1 taken along the line 2—2 thereof and showing a bearing seal member which is particularly advantageous for low torque applications, FIG. 3 is a plan view of one bearing seal arrangement of the invention during an intermediate stage of manufacture, FIG. 4 is a cross-sectional view of the bearing seal structure of FIG. 3 taken along the line 4—4 thereof, FIG. 5 is a plan view of the bearing seal member as it appears prior to its assembly into the bearing, FIG. 6 is a view of the bearing seal member of FIG. 5 taken along the line 6—6 thereof, FIG. 7 is a view similar to a portion of FIG. 2 showing a modification of the bearing seal arrangement of FIG. 2, FIG. 8 shows a still further modification of the bearing seal arrangement of FIG. 2, FIG. 9 shows a modification of the bearing seal member similar to that shown in FIG. 5, FIG. 10 is a view of the bearing seal member of FIG. 9 taken along the line 10—10 thereof, FIG. 11 is a view similar to a portion of FIG. 2 and showing the bearing seal member of FIGS. 9 and 10 therein, FIG. 12 shows a still further embodiment of the bearing seal member, FIG. 13 shows a view of the bearing seal member of FIG. 12 taken along the line 13—13 thereof, FIG. 14 shows a view similar to a portion of FIG. 2 with the seal member of FIGS. 12 and 13 therein, FIG. 15 illustrates yet a further modification of the FIG. 2 arrangement which is particularly useful for extremely low torque applications, FIG. 16 shows yet another embodiment of the bearing seal member of the invention, FIG. 17 shows a view of the bearing seal member of FIG. 16 taken along the line 17—17 thereof, FIG. 18 is a view similar to a portion of FIG. 2 showing the bearing seal member of FIGS. 16 and 17 therein, and FIG. 19 illustrates yet another modification which is useful for exceptionally low torque applications.

Referring now to FIGS. 1 and 2, there is shown a bearing assembly according to the invention, which includes an inner ring 10, and outer ring 12, a ball separator 14, and antifriction elements in the form of balls 16. Seal caps 18 and 28 are provided and are held in position by means of wire snap rings 20 and 30, respectively. Composite flexible bearing seal members 22 and 32 are provided between the seal caps 18 and 28, respectively, and the inner ring 10, whereby a novel seal construction in accordance with the invention is provided which affords substantial advantages over prior art sealing arrangements. Each bearing seal member cooperates with its adjacent seal cap to retain lubricant in the region adjacent the antifriction elements in the bearing and to keep out dirt and contaminants, as will be understood.

Referring now also to FIGS. 3–6, the novel bearing seal arrangement of this invention is achieved by forming the composite flexible seal members 22 and 32 in sandwich-like fashion of two materials having different characteristics. One material, indicated by the numeral 24' in FIGS. 3 and 4, should be relatively flexible and compressible, and may be a spongy rubber material, such as, for example, urethane foam rubber, or other rubber having a low durometer hardness. The second material, indicated by the numeral 26' in FIGS. 3 and 4, should have a low wear rate and should be extremely slippery. It is preferable that this material 26' have a very low coefficient of friction, such as generally of the order of 0.04 to 0.21, and may comprise a thin layer of material such as Teflon, for example. Other materials having a suitably low coefficient of friction may, of course, also be employed, the particular coefficient of friction being related to the torque characteristics of the particular application involved.

The composite flexible bearing seal member 32 may be made in a number of ways. One preferred method is to sandwich together in large sheet form the two materials, i.e., the easily compressible rubber 24' and the Teflon 26' of FIGS. 3 and 4. This is done preferably by means of a suitable adhesive, and the surface of the Teflon may be etched to produce a more satisfactory bond with the rubber. The sandwich is then cut into circular sections of desired size as shown in FIG. 3. A "hole in the doughnut" cut is then made in the composite blank seen in FIGS. 3 and 4 to remove the center 34 thereof, thus producing the composite flexible seal member 32 seen in FIGS. 1, 2, 5 and 6. It will of course be understood that the remarks directed to the manufacture of the seal member 32 are also applicable to the seal member 22 seen in FIGS. 1 and 2, however, for purposes of simplicity, specific description is made only with reference to the seal member 32.

When the seal member 32 is inserted into the bearing assembly of FIG. 2, it is held in place on the inner ring 10 by means of an interference fit between the surface 33 and the inner circumference of the rubber 24. One alternate method of holding the seal member 32 in place is by means of a suitable adhesive between the rubber 24 and the surface 38 of the inner ring 10. The seal member 22 is, of course, secured in the same manner. Still referring to FIG. 2, it will be seen that when the seal members 22 and 32 are assembled into the bearing, the rubber portions thereof are compressed between the inner ring shoulders 39 and the seal caps 18 and 28.

It will be apparent that the composite seal members 22 and 32 provide bearing seals having certain extremely desirable high quality characteristics. Specifically these are that the bearing seals 22 and 32 are extremely flexible while at the same time providing surfaces having a very low coefficient of friction which bear against the seal caps 18 and 28. The characteristic of flexibility, due to the compressible washer 24, provides the very important advantage that a perfect bearing seal can now be maintained with a relatively large amount of misalignment between the inner and outer rings 10 and 12. It also insures a proper seal, regardless of end play or direction of thrust. Thus better lubrication and therefore longer bearing life and less replacement are assured since the lubricant is maintained within the bearing and dirt and contamination are prevented from entering the same. The degree of flexibility or durometer hardness rating of the rubber washer 24 is an important factor in obtaining the best possible seal while experiencing the minimum amount of frictional drag. I have found that for low torque bearings, a rubber washer having a Shore "A" durometer rating of 5 to 10 produces an excellent seal with very low frictional drag. However, satisfactory results can be obtained with rubber of various durometer hardness ratings since the hardness requirement could vary, depending upon the dimensions of the rubber washer 24, the size of the bearing, the rigidity of the cap, and the preferred torque level.

The low coefficient of the Teflon surface 26a affords the substantial advantage of considerably lower friction as this surface rotates with respect to the inner surface 28a of the seal cap 28. Consequently, there is much less resistance to driving torque in such a bearing arrangement, and it will be appreciated that this advantage is of great importance where low bearing torque is required.

FIGS. 7 and 8 illustrate different bearing structures whereby the composite seal members 22 and 32 are held on the inner ring 10 without contact between the Teflon 26 and the surface 33 as seen in FIG. 2. This is desirable when the component 26 is generally inelastic. In FIG. 7, this is achieved by providing an inner ring wherein the circumferential surface 40, which defines one boundary of the recess which receives the seal member 32, is made of a larger diameter than the inner circumference of the seal member shown in FIGS. 5 and 6. Accordingly, as seen in FIG. 7, the rubber portion 24 of the seal member 32 must be stretched to be mounted on the circumferential surface 40, and it will be appreciated that this stretching causes the rubber portion 24 to "grab" the surface 40. Thus the seal member 32 is positively held on the inner ring 10 and rotates with it. A chamfered surface 41 is also provided immediately adjacent the circumferential surface 40 to provide a space or region for the inner circumferential portion 44 of the Teflon 26, since the latter is generally inelastic. An alternate arrangement for providing this space or region to receive the inner circumferential portion 44 of the Teflon 26 is seen in FIG. 8.

In FIG. 8, the space or region for accommodating the inner circumferential portion 44 of the Teflon is achieved by the provision of a stepped recess arrangement whereby a circumferential surface 46 of smaller diameter than the surface 40 is provided.

FIGS. 9 and 10 illustrate a modification of the composite seal member 32 shown in FIGS. 5 and 6. In this modification, radial cuts 48 are provided in the inner circumferential portion 44 of the Teflon 26, producing the seal member 42. With this modification, the seal member 42 will be positively held on the inner ring 10 of FIG. 11 without adhesive, so long as the rubber 24 is stretched to fit over the circumferential surface 45 of the inner ring. The inner circumferential portion 44 of the Teflon will, of course, then bow slightly outward as seen in FIG. 11.

FIGS. 12 and 13 illustrate still a further embodiment of the composite seal member. In these figures, the seal member 52 is made using a Teflon washer 26 having a larger internal diameter then the rubber washer 24. The internal diameter of the rubber washer 24 in this embodiment is made considerably smaller than the diameter of the inner ring surface 33 of FIG. 14. This latter figure shows the seal member 52 in the bearing assembly and it will be appreciated that by virtue of the construction of such member, the same will be very tightly held to the inner ring 10.

In the assembly of FIG. 14, there is also provided on the inner surface of the seal cap 28, a layer 53 of material having a relatively low coefficient of friction. This layer may be a coating of Teflon, for example, which may be sprayed on. With this construction, an extremely low level of drag resistance is achieved since the low friction layer 53 is in direct contact with the Teflon washer 26.

FIG. 15 illustrates a further embodiment of the invention, wherein an extremely small area of contact is achieved between the Teflon surface 26a of the seal member 32 and the inner surface of the seal cap 28. This is achieved by providing an annular ridge 50 on the seal cap 28, which bears against the Teflon surface 26a. While there is less contact area between the seal cap 28 and the surface 26a, with this modification it will be appreciated that greater pressure may be exerted at the ridge contact area without creating as much frictional drag as would be encountered by the much larger overall surface area illustrated in the other embodiment described previously. Accordingly, it will be seen that the embodiment of FIG. 15 also results in a small frictional drag, so that this embodiment is also particularly useful for very low torque applications, as is that of FIG. 14.

FIGS. 16 and 17 illustrate yet another seal member embodiment. In the seal member 62 shown therein, a thin Teflon washer 48 is secured to the side of the foam rubber washer 24 which is to be placed in contact with the surface 38 of the inner ring 10. A second thin Teflon layer, in the form of an annular ribbon 50, is secured to the inner circumference of the rubber washer 24. The resulting seal member 62 is then assembled into the bearing as seen in FIG. 18, the surface 54 of the rubber washer 24 being in contact with the seal cap 28 and preferably bonded thereto. In this embodiment the relative movement will of course be between the inner ring 10 and the Teflon layers 48 and 50.

FIG. 19 illustrates yet another modification that is particularly suited to the requirements of very low torque applications. This is achieved by the use of a seal member 72 which comprises a rubber washer 74 having a generally rounded surface 76, with a Teflon ring 78 of rounded cross-section on the rubber surface 76. The reduction in rotational drag is due to the smaller Teflon surface in contact with the seal cap 28, by virtue of the rounded shape of this surface. This modification is advantageous over that shown in FIG. 15 since no annular ridge need be formed in the present arrangement.

It will be appreciated that a material having a low coefficient of friction can also be sprayed onto the surface of the rubber 24 in accordance with the invention, to produce a seal member having all the desirable characteristics described above. Furthermore, it will be apparent that this invention may be employed by utilizing the seal members in a manner to extend between the inner and outer rings of the bearing, without the aid of the seal caps 18 and 28.

While the foregoing description sets forth the principles of the invention in connection with specific apparatus it is to be understood that the description is made only by way of example and not as a limitation of the scope of the invention as set forth in the object thereof and in the accompanying claim.

What is claimed is:
1. A bearing arrangement comprising:
   an inner ring with an annular radially outer notch located on an axial side thereof, said notch being bordered by a radially outward extending shoulder,
   an outer ring placed concentrically with said inner ring about a bearing axis,
   antifriction elements between said inner and outer rings,
   a lubricant-retaining chamber adjacent said antifriction elements,
   a unitary annular flared walled seal cap having a substantially flat inwardly projecting flange extending from the flared wall of the seal cap,
   said cap being mounted to said outer ring at an axial side of the lubricant-retaining chamber with said flange extending in closely spaced relationship with the inner ring, and with the flared wall facing the lubricating chamber,
   a composite bearing seal mounted to said inner ring for sealing said lubricant-retaining chamber,
   said composite annular seal comprising a first annular body of rubber-like resilient and compressible material and second annular body of flat sheet material having a slippery low-friction characteristic,
   said second body of flat sheet material being concentrically bonded in sandwich fashion to said first annular body of material,
   said composite bearing seal being resiliently held on said inner ring on the annular notch at one axial side of the lubricating chamber and with said first body in compressive, nonslipping relationship with the inner ring and axially supported by said radially outward extending shoulder,
   said composite bearing seal being placed on said inner ring on a side of the seal cap flange facing the lubricant-retaining chamber with said second body of flat sheet material having a planar face in continuously annular axial compressive relationship with the flange of the seal cap, said composite annular seal having a radially outer peripheral surface having a diameter sized for spatial mounting thereof from the flared wall to permit radial expansion of the composite seal arising from axial compression of the composite seal by said flange, whereby
   said seal produces between said inner and outer rings a high quality seal which is characterized by an extremely low frictional drag to the torque which drives one of said rings relative to the other ring.

References Cited

UNITED STATES PATENTS

| | | | |
|---|---|---|---|
| 1,420,416 | 6/1922 | Dlesk | 308—187.2 |
| 2,341,900 | 2/1944 | Boden | 277—92 |
| 2,373,443 | 4/1945 | Armington | 277—92 |
| 2,590,422 | 3/1952 | Large. | |
| 3,135,128 | 6/1964 | Rudolph | 277—95 X |
| 3,140,902 | 7/1964 | Herbst | 277—188 X |
| 3,279,803 | 10/1966 | Sekulich | 277—95 X |

FREDERICK L. MATTESON, JR., *Primary Examiner.*

R. A. DUA, *Assistant Examiner.*

U.S. Cl. X.R.

277—95, 227